US009975276B2

(12) United States Patent
Dufort et al.

(10) Patent No.: US 9,975,276 B2
(45) Date of Patent: May 22, 2018

(54) SYSTEM AND METHOD FOR REMOVING SUPPORT STRUCTURE FROM THREE-DIMENSIONAL PRINTED OBJECTS USING MICROWAVE ENERGY

(71) Applicant: Xerox Corporation, Norwalk, CT (US)

(72) Inventors: Ron E. Dufort, Rochester, NY (US); Erwin Ruiz, Rochester, NY (US); Linn C. Hoover, Webster, NY (US); David K. Ahl, Rochester, NY (US); Patrick J. Howe, Fairport, NY (US); Andrew W. Hays, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 158 days.

(21) Appl. No.: 14/938,265

(22) Filed: Nov. 11, 2015

(65) Prior Publication Data

US 2017/0129188 A1 May 11, 2017

(51) Int. Cl.

| | |
|---|---|
| ***B32B 3/10*** | (2006.01) |
| ***B29C 35/08*** | (2006.01) |
| ***B29C 71/00*** | (2006.01) |
| ***B29C 71/04*** | (2006.01) |
| ***H05B 6/64*** | (2006.01) |
| ***H05B 6/80*** | (2006.01) |
| ***B29C 64/112*** | (2017.01) |
| ***B29C 64/20*** | (2017.01) |
| ***B29C 64/40*** | (2017.01) |
| *B33Y 10/00* | (2015.01) |

(Continued)

(52) U.S. Cl.

CPC ........ *B29C 35/0805* (2013.01); *B29C 64/112* (2017.08); *B29C 64/20* (2017.08); *B29C 64/40* (2017.08); *B29C 71/0009* (2013.01); *B29C 71/04* (2013.01); *H05B 6/645* (2013.01); *H05B 6/80* (2013.01); *B29C 2035/0855* (2013.01); *B29C 2071/0045* (2013.01); *B33Y 10/00* (2014.12); *B33Y 30/00* (2014.12); *B33Y 50/02* (2014.12); *B33Y 80/00* (2014.12); *H05B 2214/04* (2013.01)

(58) Field of Classification Search

None

See application file for complete search history.

(56) References Cited

U.S. PATENT DOCUMENTS

| | | | |
|---|---|---|---|
| 4,959,516 | A | 9/1990 | Tighe et al. |
| 5,220,346 | A | 6/1993 | Carreira et al. |

(Continued)

FOREIGN PATENT DOCUMENTS

| | | | |
|---|---|---|---|
| WO | 2014/177823 | A1 | 11/2014 |
| WO | 2014/197086 | A9 | 12/2014 |

*Primary Examiner* — Christopher Polley

(74) *Attorney, Agent, or Firm* — Maginot Moore & Beck LLP

(57) ABSTRACT

A method of manufacturing a three-dimensional object facilitates the removal of support material from the object. The method includes moving the object to a position opposite a microwave radiator and operating the microwave radiator to change the phase of the support material from solid to liquid. A controller either monitors the expiration of a predetermined time period or a temperature of the object to determine when the microwave radiator operation is terminated. The microwave radiation does not damage the object because the support material has a dielectric loss factor that is greater than the dielectric loss factor of the object.

20 Claims, 4 Drawing Sheets

500
ACTUATOR
CONTROLLER
520
540
580
504
512
MICROWAVE RADIATOR
EJECTOR HEAD(S)
TEMP SENSOR
516
204
208
200
536
104
532
524
524
508
528
PUMP

(51) Int. Cl.

*B33Y 30/00* (2015.01)
*B33Y 50/02* (2015.01)
*B33Y 80/00* (2015.01)

(56) References Cited

U.S. PATENT DOCUMENTS

| | | | | | |
|---|---|---|---|---|---|
| 5,386,500 | A * | 1/1995 | Pomerantz | B33Y 50/02 264/401 |
| 5,422,463 | A * | 6/1995 | Gooray | B41J 11/002 219/692 |
| 5,563,644 | A | 10/1996 | Isganitis et al. | |
| 5,631,685 | A | 5/1997 | Gooray et al. | |
| 6,155,331 | A | 12/2000 | Langer et al. | |
| 6,869,559 | B2 | 3/2005 | Hopkins | |
| 8,459,280 | B2 | 6/2013 | Swanson et al. | |
| 2003/0222366 | A1 | 12/2003 | Stangel et al. | |
| 2013/0075957 | A1* | 3/2013 | Swanson | B08B 3/104 264/405 |
| 2013/0337277 | A1* | 12/2013 | Dikovsky | B29C 67/0092 428/474.7 |
| 2014/0332997 | A1 | 11/2014 | Shih et al. | |

* cited by examiner

SYSTEM AND METHOD FOR REMOVING SUPPORT STRUCTURE FROM THREE-DIMENSIONAL PRINTED OBJECTS USING MICROWAVE ENERGY

TECHNICAL FIELD

The system and method disclosed in this document relates to processing of three-dimensional printed objects and, more particularly, to the removal of support material from three-dimensional printed objects.

BACKGROUND

Digital three-dimensional object manufacturing, also known as digital additive manufacturing, is a process of making a three-dimensional solid object of virtually any shape from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. In many three-dimensional object printers, support material is included in a layer to enable areas of object material in the layer to be formed where no surface or previously formed portions of the object exist. Particularly, these support areas are formed with a support material, such as wax, on top of areas of the object or adjacent to portions of the object. After the object is formed, the support material is removed from the object. The support material is typically removed by soaking the object in water, jetting water onto the object, soaking the object in chemicals other than water, or heating the object in a convection oven. However, each of these methods has limitations that are exacerbated as the size of the printed object increases.

As three-dimensional object printers become larger to increase the volume production of the printer, multiple parts can be stacked in three-dimensions, separated by support material. However, in these multiple object production runs, a substantial amount of support material must be removed after the objects are fully formed. What is needed is a method for efficient removal of substantial amounts of support material from printed parts in order to increase overall production speeds.

SUMMARY

A method of facilitating removal of support material from one or more three-dimensional printed objects includes operating a transport to move a platen, operating an ejector head to eject drops of a first material and drops of a second material towards the platen to form an object having support material, and operating a microwave radiator to irradiate the object having support material with microwave energy in response to the transport moving the platen to a position opposite the microwave radiator, the microwave energy heating the support material to a temperature at which the support material changes phase from a solid to a liquid so the support material flows away from the object.

A system for printing three-dimensional printed objects with support material that facilitates support material removal includes a platen, a transport configured to move the platen, an ejector head configured to eject drops of a first material and drops of a second material towards the platen to form an object having support material, and a microwave radiator configured to irradiate the object having support material with microwave energy in response to the transport moving the platen to a position opposite the microwave radiator, the microwave energy heating the support material to a temperature at which the support material changes phase from a solid to a liquid so the support material flows away from the object.

BRIEF DESCRIPTION OF THE DRAWINGS

The foregoing aspects and other features of the method and printer are explained in the following description, taken in connection with the accompanying drawings.

DETAILED DESCRIPTION

Figure 1:
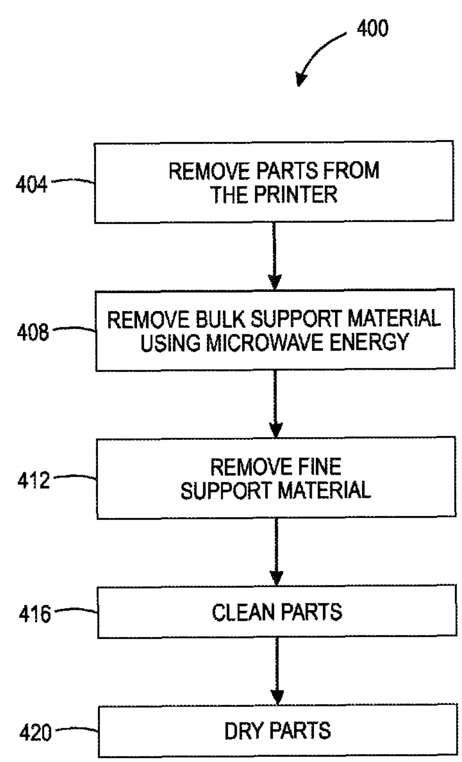
FIG. 1 shows a process for removing support material from a printed object with microwave energy.

For a general understanding of the environment for the method disclosed herein as well as the details for the method, reference is made to the drawings. In the drawings, like reference numerals designate like elements.

Figure 3:
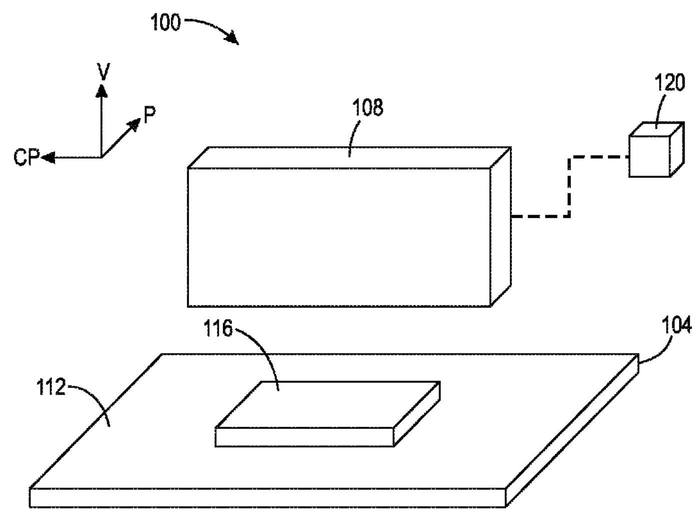
FIG. 3 shows a prior art three-dimensional object printer.

FIG. 3 shows a prior art three-dimensional object printer 100 that ejects material to form support and object areas in layers. The printer 100 comprises a platen 104 and an ejector head 108. The ejector head 108 has a plurality of ejectors configured to eject drops of material towards a surface 112 of the platen 104 to form a three-dimensional object, such as the part 116, and support areas that enable part feature formation. Particularly, the ejector head 108 has a first plurality of ejectors configured to eject drops of a build material to form an object and a second plurality of ejectors configured to eject drops of a support material, such as wax, to form a scaffolding to support the object being formed. As used in this document, "support" means one or more layers of support material on which layers of build material are built adjacent to or upon to enable layers of a portion of the object to be formed without deformation caused by gravity or laminar flow of the build material prior to the build material being converted from a fluid or powder to a solid by a curing process such as thermal fusing or exposure to UV radiation. "Support material" means a material used in the printing of an object that is removed from the object after the object is printed. The ejector head 108 is configured to move relative to the platen 104 in the process direction P, the cross-process direction CP, and the vertical direction V. In some embodiments, the printer 100 includes actuators configured to move one or both of the ejector head 108 and the platen 104 with respect to one another.

The printer 100 includes a controller 120 operatively connected to at least the ejector head 108. The controller 120 is configured to operate the ejector head 108 with reference to object image data that has been rendered into layers that form a three-dimensional object on the platen surface 112. To form each layer of the three-dimensional object, the controller 124 operates the printer 100 to sweep the ejector head 108 one or more times in the process direction P, while ejecting drops of material onto the platen 104. In the case of multiple passes, the ejector head 108 shifts in the cross-process direction CP between each sweep. After each layer is formed, the ejector head 108 moves away from the platen 104 in the vertical direction V to begin printing the next layer.

Figure 4:
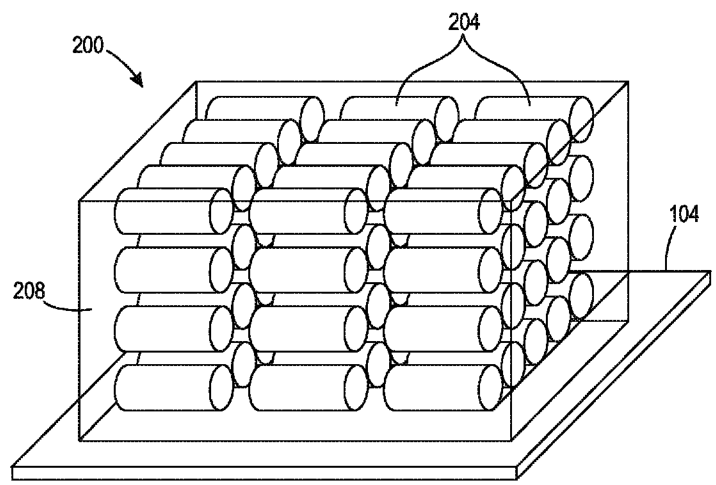
FIG. 4 shows a perspective view of a prior art printed block having a plurality of identical parts separated by support material.
Figure 5:
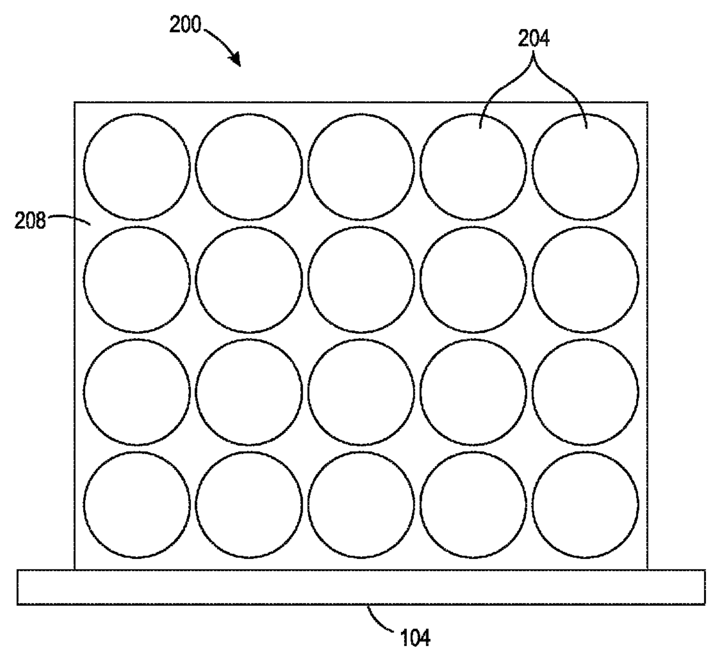
FIG. 5 shows a side view of the prior art block shown in FIG. 4.

In some embodiments, the printer 100 is sufficiently large to enable production runs comprising more than one part. Particularly, a plurality of parts can be printed in a single print job with each part being encapsulated by support material to form a block of material. In some embodiments, the controller 120 receives image data corresponding to a plurality of parts arranged in three-dimensional space with support material arranged between each of the parts to allow the plurality of parts to be printed as a single block. With reference to the image data, the controller 120 operates the ejector head 108 to form the plurality of parts in a single production run. FIG. 4 shows a perspective view of a prior art block 200 having a plurality of identical parts 204 formed on the platen 104. The parts 204 are essentially arranged in a three-dimensional matrix and can be uniformly spaced throughout the block 200. The parts 204 are separated by support material 208. In other embodiments, the plurality of parts may be different types of parts and may be arranged with respect to one another to efficiently use the space within the block 200. FIG. 5 shows a side view of the prior art block 200.

As shown in FIGS. 4 and 5, the block 200 comprises a substantial amount of support material 208 that must be removed to release the parts 204. To hasten the support material removal process that was performed with a conventional convection oven, process 400 of FIG. 1 uses microwave energy to heat and phase change the support material 208. In the description of the process 400, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 120 of the printer 100 noted above can be configured with components and programmed instruction to provide a controller or processor that performs the process 400. Alternatively, the controller can be implemented with more than one processor and associated circuitry and components, each of which is configured to form one or more tasks or functions described herein.

The method 400 begins by removing the parts from the printer (block 404). The parts can be removed by lifting the parts 204 that contain support material 208 from the platen 104 or by moving the platen 104, which supports the parts 204 that contain the support material 208, out of the printer. If the parts require additional curing, they are exposed to the curing radiation or allowed to cool for solidification of the materials. Once the parts are cured, the bulk support material is removed using microwave energy (block 408). In previously known methods for removing bulk support material, the parts 204 are placed in a convection oven heated to a predetermined temperature at which the support material 208 changes from a solid phase to a liquid phase. For example, a convection oven can be heated to a temperature of 65 degrees Celsius to melt wax support material provided the part is left in the oven cavity for an amount of time adequate for the support material to reach the melting temperature. The part 204 containing wax support material is typically left in the heated cavity of a convection oven at a temperature of 65 degrees Celsius for approximately 60 to 120 minutes to enable the wax support material to melt and separate from the part 204. The temperature of the part 204 is typically monitored and the part 204 is removed from the oven in response to the temperature of the part reaching a predetermined threshold temperature that is below the temperature at which the build material of the part begins to deform. Because some of the support material may remain, the part 204 is further treated to remove the smaller remaining amounts of support material (block 412). In one embodiment, this further treatment includes submerging the part 204 in a rinse solution held at a predetermined temperature, for example, 60 degrees Celsius, and subjected to ultrasonic vibrations in the solution. The ultrasonic vibrations in this embodiment are applied for approximately 5 minutes. Once the vibrations are terminated, the part remains in the solution for another predetermined period of time, such as 2 minutes, before the part is removed from the support material bath and placed in a cleaning vat (block 416). The cleaning vat typically includes warm soapy water and ultrasonic vibrations are again applied to the part in the soapy water for another predetermined time period, such as 20 minutes. The part is then removed from the cleaning vat and dried (block 420). The drying can occur in ambient air or in a convection oven heated to a relatively mild temperature, such as 40 degrees Celsius.

Figure 2A:
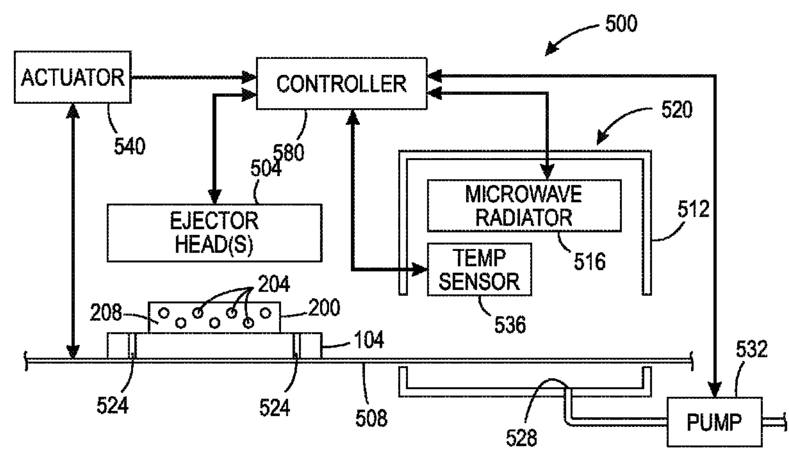
FIG. 2A depicts a system that enables support material to be removed from a printed object with microwave energy.

A three-dimensional object production system 500 is shown in FIG. 2A. The system 500 includes one or more ejector heads 504, a controller 580, a non-contact temperature sensor 536, a microwave radiator 516, and a housing 512. Controller 580 can be the controller 120 configured with programmed instructions and components to operate the ejector head(s) 504 to form an object with support material and to operate the microwave heating station 520 to remove the support material. Each of the ejector heads contains a plurality of ejectors that the controller 580 operates to eject a plurality of materials to form object and support areas in the layers of the parts formed on the platen 104. In some embodiments of the system of FIG. 2A, at least one ejector head 504 is configured to eject build material for object areas and at least two ejector heads 504 are configured to eject support build material having different dielectric loss factors. That is, one ejector head 504 ejects support material having a first dielectric loss factor that is greater than the dielectric loss factor in the support material ejected by another ejector head 504. These two ejector heads 504 ejecting support material can be operated by the controller to form interior support areas of the parts 204 with the support material having the greater dielectric loss factor and to form exterior support areas of the part 204 with the support material having the second dielectric loss factor. This operation of the system is particularly advantageous for part protection because the support material having the greater dielectric loss factor generates more heat for melting the support material than the support material having the second dielectric loss factor. Thus, the support material having the greater dielectric loss factor melts before the support material having the second dielectric loss factor. Consequently, the interior support melts before the exterior support so the exterior support continues to absorb microwave energy and protect the build material of the part from heating to a temperature that deforms the part. When the last layer of the exterior support is melted, the part is ready.

The platen 104 is supported by a transport 508 that moves the block 200 with the parts 204 and the support material 208 from the position beneath the ejector head(s) 504 to the microwave heating station 520. The microwave heating station 520 includes the housing 512 having an ingress and egress to enable the transport 508 to move the block 200 into the housing 512 of the station 520 and then move the platen and the parts 204 out of the housing to the next processing station. Within the housing 512, a microwave radiator 516 is positioned to irradiate the block 200 with microwave energy while the transport 508 remains still to enable the block 200 to be subjected to the emitted microwave energy for a predetermined period of time or until the temperature of the parts 204 reach a temperature that indicates the part is approaching, but has not reached, a temperature that could damage the part. In the embodiment that monitors the part temperature, the non-contact temperature sensor 536 generates a signal indicative of the part temperature that the controller 580 compares to a predetermined temperature threshold. In one embodiment, the non-contact temperature sensor is a laser therometer. When the predetermined temperature threshold has been reached or the predetermined time period has expired, the controller 580 operates an actuator 540 that drives transport 508 to move the parts 204 out of the housing to the next processing station.

Figure 2B:
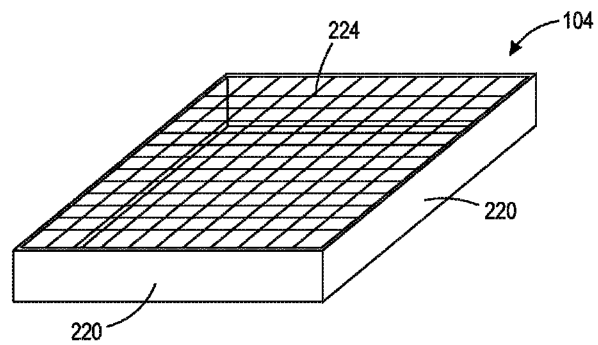
FIG. 2B depicts an alternate embodiment of the platen shown in FIG. 2A.

The platen 104 shown in FIG. 2A includes one or more through holes 524 that enable the melted support material to leave the platen 104 and fall to the floor of the housing 512. The floor of the housing 512 includes a drain 528 that enables the melted support material to exit the housing 512. The controller 580 can be operatively connected to a pump 532 to urge the melted support material to leave the housing 512 or the floor of the housing 512 can be formed with a slope that enables the melted support material to flow to the drain 528 and leave the housing 512 under the effect of gravity. In another embodiment shown in FIG. 2B, the platen 104 is a box having solid sides 220 and an open top. A metal screen 224 is placed over the open top and the block 200 rests on the metal screen. During exposure to the microwaves, the melted support material flows through the metal screen into the metal box where it solidifies. The material solidifies because the openings in the screen are sized to prevent microwave energy from entering the box through the screen in a known manner.

The above-described method and system are effective for removing support material from the parts when the support material has a dielectric loss factor that is greater than a dielectric loss factor of the build material. "Dielectric loss factor" is a measurement of the energy dissipated as heat by a material in an oscillating field. The dielectric loss factor of the support material enables the microwave energy to heat the support material and produce a phase change in the support material without significantly heating the build material of the part. Thus, the support material is melted and removed from the parts without damaging or adversely affecting the parts. Another advantage of using a support material that has a dielectric loss factor that is greater than the dielectric loss factor of the build material is that the support material and build material can have melting temperatures that are close to one another, but the difference in the dielectric loss factors of the two materials enables the support material to reach that temperature before the build material begins to approach the melting temperature.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method for producing a three-dimensional object comprising:

operating a transport with a controller to move a platen to a first position;

operating at least two ejector heads located opposite the first position with the controller to eject drops of a first material having a first dielectric loss factor with a first ejector head of the at least two ejector heads towards the platen at the first position to form an object on the platen and to eject drops of a second material having a second dielectric loss factor with a second ejector head of the at least two ejector heads towards the platen at the first position to form a support for the object on the platen, the second dielectric loss factor being greater than the first dielectric loss factor;

operating the transport with the controller to move the platen from the first position to a second position; and operating a microwave radiator opposite the second position with the controller to irradiate the object and the support on the platen at the second position with microwave energy to heat the support to a temperature that changes the support from a solid phase to a liquid phase to enable the support in the liquid phase to flow away from the object.

2. The method of claim 1, the operation of the second ejector head of the at least two ejector heads further comprising:

operating the second ejector head of the at least two other ejector heads with the controller to eject drops of the second material having the second dielectric loss factor to form first portions of the support for the object on the platen with the second material and to eject drops of a third material having a third dielectric loss factor that is greater than the second dielectric loss factor towards the platen to form second portions of the support with the third material to enable the microwave energy from the microwave radiator to change the second portions of the support from the solid phase to the liquid phase before the first portions of the support begin to change from the solid phase to the liquid phase.

3. The system of claim 2, the operation of the at least two ejector heads with the controller further comprising:

operating the second ejector head of the at least two ejector heads to form the first portions of the support with the second material on exterior areas of the object on the platen and to form the second portions of the support with the third material on interior areas of the object on the platen.

4. The method of claim 1 further comprising:

operating the transport with the controller to move the platen through a first opening in a housing to position the platen at the second position that is opposite the microwave radiator.

5. The method of claim 4 further comprising:

collecting the support in the liquid phase on a floor of the housing having the first opening.

6. The method of claim 5 further comprising:

evacuating the support in the liquid phase from the floor of the housing through a drain in the floor of the housing.

7. The method of claim 6 further comprising:

pumping the support in the liquid phase through the drain with a pump operatively connected to the drain.

8. The method of claim 4 further comprising:

operating the transport with the controller to move the platen through a second opening in the housing to exit the platen from the housing in response to an expiration of a predetermined time period following activation of the microwave radiator.

9. The method of claim 4 further comprising:

operating the transport with the controller to move the platen through a second opening in the housing to exit the platen from the housing in response to a signal generated by a non-contact temperature sensor indicating a predetermined temperature of the object has been reached.

10. A method for producing a three-dimensional object comprising:

operating a transport with a controller to move a platen to a first position;

operating a first ejector head of at least two ejector heads located opposite the first position with the controller to eject drops of a first material having a first dielectric loss factor towards the platen at the first position to form an object on the platen;

operating a second ejector head of the at least two other ejector heads with the controller to eject drops of the second material having the second dielectric loss factor that is greater than the first dielectric loss factor to form first portions of the support for the object on the platen with the second material and to eject drops of a third material having a third dielectric loss factor that is greater than the second dielectric loss factor towards the platen to form second portions of the support with the third material;

operating the transport with the controller to move the platen from the first position to a second position; and operating a microwave radiator opposite the second position with the controller to irradiate the object and the support on the platen at the second position with microwave energy to heat the support to a temperature that changes the second portions of the support from a solid phase to a liquid phase before the first portions of the support begin to change from the solid phase to the liquid phase.

11. The method of claim 10, the operation of the at least two ejector heads with the controller further comprising:

operating the second ejector head of the at least two ejector heads to form the first portions of the support with the second material on exterior areas of the object on the platen and to form the second portions of the support with the third material on interior areas of the object on the platen.

12. The method of claim 10 further comprising:

operating the transport with the controller to move the platen through a first opening in a housing to position the platen at the second position that is opposite the microwave radiator.

13. The method of claim 12 further comprising:

collecting the first portions and the second portions of the support in the liquid phase on a floor of the housing having the first opening.

14. The method of claim 5 further comprising:

evacuating the first portions and the second portions of the support in the liquid phase from the floor of the housing through a drain in the floor of the housing.

15. The method of claim 6 further comprising:

pumping the first portions and the second portions of the support in the liquid phase through the drain with a pump operatively connected to the drain.

16. The method of claim 4 further comprising:

operating the transport with the controller to move the platen through a second opening in the housing to exit the platen from the housing in response to an expiration of a predetermined time period following activation of the microwave radiator.

17. The method of claim 4 further comprising:

operating the transport with the controller to move the platen through a second opening in the housing to exit the platen from the housing in response to a signal generated by a non-contact temperature sensor indicating a predetermined temperature of the object has been reached.

18. A method for producing a three-dimensional object comprising:

operating a transport with a controller to move a platen to a first position;

operating at least two ejector heads located opposite the first position with the controller to eject drops of a first material having a first dielectric loss factor with a first ejector head of the at least two ejector heads towards the platen at the first position to form an object on the platen and to eject drops of a second material having a second dielectric loss factor with a second ejector head of the at least two ejector heads towards the platen at the first position to form a support for the object on the platen, the second dielectric loss factor being greater than the first dielectric loss factor;

operating the transport with the controller to move the platen from the first position through a first opening in a housing to a second position within the housing;

operating a microwave radiator opposite the second position with the controller to irradiate the object and the support on the platen at the second position with microwave energy to heat the support to a temperature that changes the support from a solid phase to a liquid phase to enable the support in the liquid phase to flow away from the object;

collecting the support in the liquid phase on a floor of the housing having the first opening;

evacuating the support in the liquid phase from the floor of the housing through a drain in the floor of the housing; and pumping the support in the liquid phase through the drain with a pump operatively connected to the drain.

19. The method of claim 18 further comprising:

operating the transport with the controller to move the platen through a second opening in the housing to exit the platen from the housing in response to an expiration of a predetermined time period following activation of the microwave radiator.

20. The method of claim 18 further comprising:

operating the transport with the controller to move the platen through a second opening in the housing to exit the platen from the housing in response to a signal generated by a non-contact temperature sensor indicating a predetermined temperature of the object has been reached.

* * * * *